Patented May 12, 1931

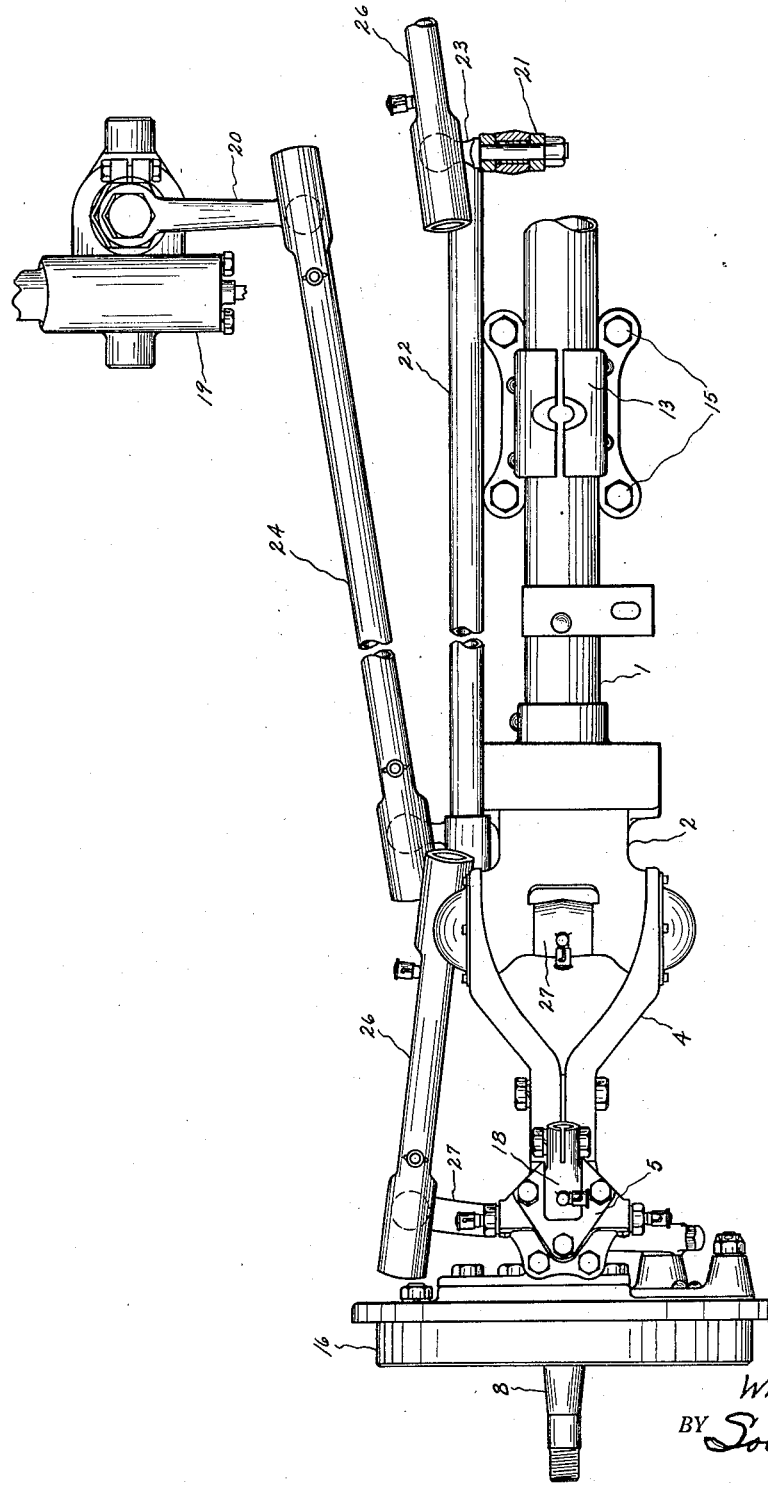

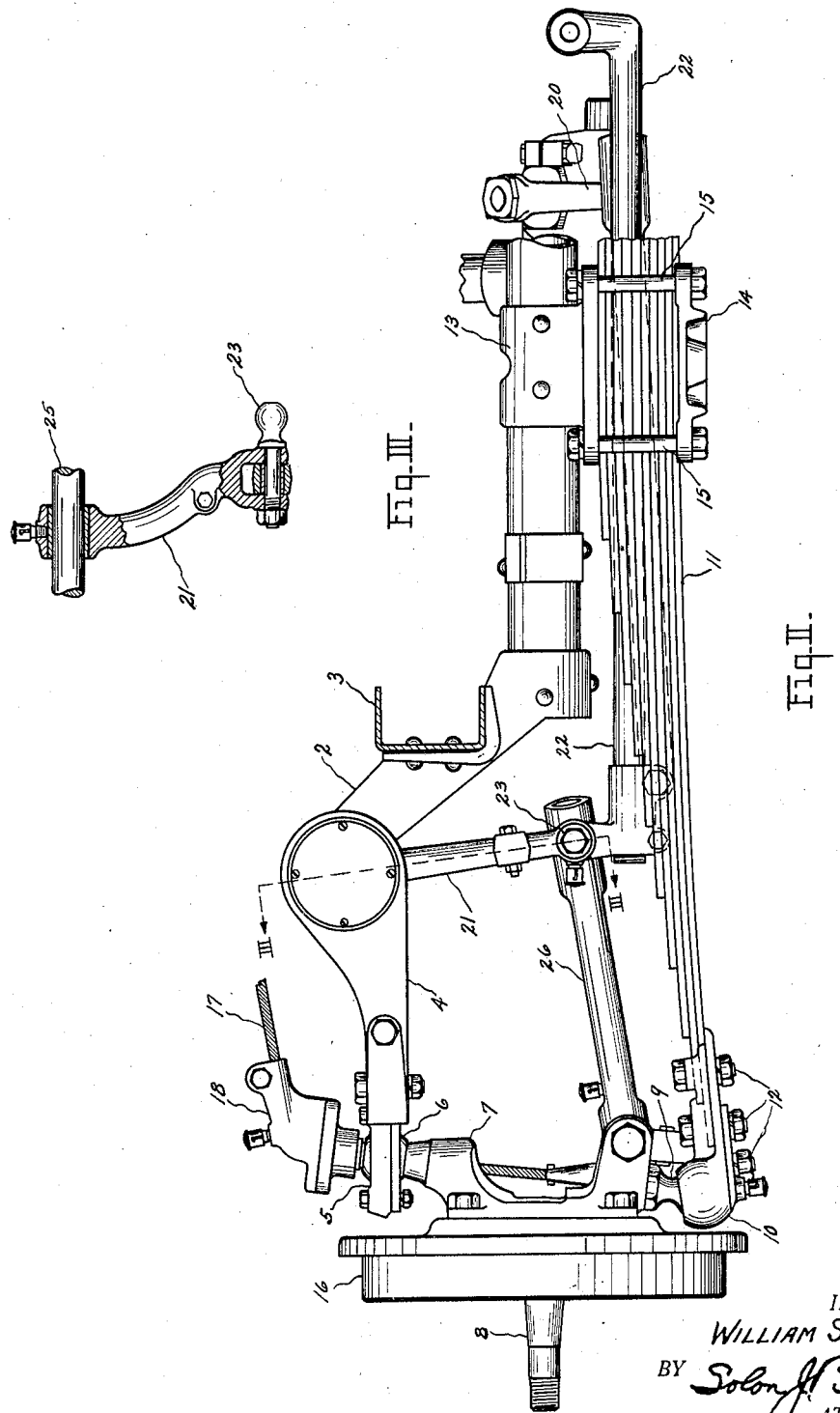

1,804,713

UNITED STATES PATENT OFFICE

WILLIAM S. STOCKTON, OF TOLEDO, OHIO, ASSIGNOR TO THE WILLYS-OVERLAND COMPANY, OF TOLEDO, OHIO, A CORPORATION OF OHIO

STEERING CONTROL

Application filed November 26, 1926. Serial No. 150,743.

This invention relates to steering controls for automotive vehicles and more particularly to steering controls for motor vehicles that have the steering wheels mounted to move independently of each other in a vertical direction.

One object of the invention is to provide a steering control for a motor vehicle having independently movable wheels that will be unaffected by the vertical movement of the wheels.

Another object of the invention is to provide a motor vehicle having independently movable wheels, with a steering control of the ball and socket type.

Another object of the invention is to provide a motor vehicle having independently movable wheels with a steering control of the ball and socket type that will permit one wheel to move in a vertical direction without affecting the steering connection to either wheel.

Other objects of the invention will appear from the description to follow, in conjunction with which for the purposes of the present application I have illustrated one embodiment of the invention in the accompanying drawings in which:

Figure I is a top plan view, partly in section, of a portion of a motor vehicle front axle, illustrating a steering control constructed according to my invention.

Fig. II is a front elevation of the axle shown in Fig. I.

Fig. III is a sectional view of the steering control lever taken on line III—III of Fig. II.

It is desirable to have the front wheels of motor vehicles independently movable in a vertical direction, but one of the difficulties encountered with such a construction is the undesirable effect of the wheel movement upon the steering controls. The conventional steering control, having a drag link connecting the steering gear with one knuckle and a rigid tie-rod between the knuckles, can not be used because the vertical movement of the wheels will vary the distance between the wheels, and the inextensible tie-rod will cause the wheels to be deflected by the wheel movement.

It is the intention of the present invention to provide a motor vehicle of the independently movable wheel type, with a steering control having the majority of its parts of substantially conventional design, but having novel supporting means, hereinafter described, that will permit the control to be used satisfactorily with an axle having wheels independently movable in a vertical direction.

Referring to the drawings in which like characters refer to like parts through the views, 1 is a transverse supporting member of a motor vehicle to which the bracket 2 is secured for supporting the usual vehicle frame 3 and the wheel mounting hereinafter described. A bifurcated arm 4 is pivotally mounted on bracket 2 to operate in a vertical plane and is fitted with a socket joint 5 at its outer end for enclosing ball 6 on the steering knuckle 7 that carries the vehicle wheel (not shown) by means of spindle 8. The lower portion of knuckle 7 is provided with a second ball 9 enclosed by a socket 10 secured to the vehicle spring 11 by means of bolts 12. Spring 11 is secured to axle 1 at its middle portion by any suitable means such as clip 13, plate 14 and bolts 15.

The above described support for knuckle 7 is duplicated for the opposite knuckle (not shown) and permits each knuckle to move independently of the other in a vertical direction. Spring 11 is preferably so selected that the movement of socket 10 is substantially an arc whose radius is substantially equal to the length of arm 4. This movement is nearly vertical and knuckle 7 moves in much the same manner that it would move if the knuckle were supported by two arms similar to present arm 4, the pivoted points of the arms defining the four corners of a parallelogram as viewed from the front. Any desired brake mechanism operating on drum 16 may be operated by cable 17 passing through swivel joint 18, the details of which are not essential to the present application and need not be described herein.

Vehicles having knuckles, supported in the manner hereinbefore described, have been used before with gratifying results, but it may readily be seen that the knuckle 7 is moved toward and away from the centerline of the vehicle, as arm 4 recedes from or approaches its horizontal position, with a consequent variation in the distance between the knuckles. The variable distance between the knuckles 7 precludes the use of the usual rigid tie-rod that ordinarily connects fixed parts of the knuckles and it is one of the purposes of the present invention to provide control connections that will not be influenced by the movement of either knuckle.

In carrying out the invention I prefer to use a steering gear 19 in which the steering arm 20 moves transversely of the vehicle and to provide a lever 21 to which a relatively short tie-rod 22 is connected by the ball head of pivot pin 23, tie-rod 22 being connected to steering arm 20 by a suitable ball jointed drag link 24. Lever 21 is pivotally mounted in bracket 2 by means of shaft 25 and is rotatable about the same center as arm 4. A short rod 26 having ball sockets at each end is secured at one end to the ball portion of pivot pin 23 and at the other end is secured to the ball of knuckle arm 27 which is rigidly mounted on knuckle 7. The ball of pivot pin 23 and ball of the knuckle arm 27 are preferably located, insofar as is mechanically convenient, to lie within opposite sides of the theoretical parallelogram hereinbefore stated as giving a similar motion of the knuckle to that given by the structure illustrated in the drawings.

The location of the balls of course can not easily be determined but it has been found that if ball of arm 27 be substantially level with top of spring 11 and the lever 21 has its ball joint 23 at substantially the same distance below shaft 25 as the distance between ball joints 5 and the ball of knuckle arm 27, the action is satisfactory and no appreciable effect of wheel movement on the steering gear is noticed.

While I have illustrated and described somewhat in detail, one embodiment of the invention, it is to be understood that this showing and description are illustrative only and that I do not regard the invention as limited to the details of construction shown and described except insofar as I have included such limitations within the terms of the following claims, in which it is my intention to claim all novelty inherent in the invention, broadly as well as specifically.

I claim:

1. In a steering control for a motor vehicle having dirigible wheels independently movable in a vertical direction, the combination wth a wheel knuckle, of an arm pivotally mounted on the vehicle and having a ball joint connection with said knuckle, a spring having a ball joint connection to said knuckle and a fixed connection to the vehicle, a lever having a pivotal mounting on said vehicle concentric with the axis of said arm and extending toward said spring, a rod having ball joint connections with said lever and said knuckle for rotating the knuckle in its ball joint mountings and means for operating said lever.

2. In a steering control for a motor vehicle having dirigible wheels independently movable in a vertical direction, the combination with a wheel knuckle, of a bifurcated arm pivotally mounted on the vehicle and having a ball joint connection with said knuckle, a spring having a ball joint connection to said knuckle and a fixed connection to said vehicle, a lever pivotally mounted on said vehicle between the bifurcation of said arm substantially concentric with the axis of said arm and extending toward said spring, a rod having ball joint connections with said lever and said knuckle for rotating the knuckle in its ball joint mountings, and means for operating said lever.

In testimony whereof, I affix my signature.

WILLIAM S. STOCKTON.